US009569881B2

(12) United States Patent
Shin et al.

(10) Patent No.: US 9,569,881 B2
(45) Date of Patent: Feb. 14, 2017

(54) METHOD AND APPARATUS PROCESSING RAY BOUNDING BOX INTERSECTION

(71) Applicant: Samsung Electronics Co., Ltd., Suwon-si (KR)

(72) Inventors: Youngsam Shin, Hwaseong-si (KR); Wonjong Lee, Seoul (KR); Jaedon Lee, Yongin (KR); Seokjoong Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 31 days.

(21) Appl. No.: 14/591,757

(22) Filed: Jan. 7, 2015

(65) Prior Publication Data

US 2015/0379756 A1   Dec. 31, 2015

(30) Foreign Application Priority Data

Jun. 30, 2014   (KR) .................. 10-2014-0081219

(51) Int. Cl.
    *G06T 15/06*   (2011.01)
(52) U.S. Cl.
    CPC ........... *G06T 15/06* (2013.01); *G06T 2210/12* (2013.01)
(58) Field of Classification Search
    CPC ...... G06T 15/04; G06T 15/06; G06T 2200/28; G06T 2210/12
    USPC ........................................ 345/418, 419, 420
    See application file for complete search history.

(56) References Cited

U.S. PATENT DOCUMENTS

| 7,088,358 | B2 |   | 8/2006 | Aharon et al. |
|-----------|----|---|--------|---------------|
| 7,495,664 | B2 |   | 2/2009 | Keller et al. |
| 8,217,935 | B2 |   | 7/2012 | Purcell et al. |
| 8,421,801 | B2 |   | 4/2013 | Salsbury et al. |
| 8,564,589 | B1 | * | 10/2013 | Aila ........................ G06T 15/06 345/426 |
| 2008/0043018 | A1 | * | 2/2008 | Keller ..................... G06T 15/06 345/426 |
| 2008/0088622 | A1 | * | 4/2008 | Shearer ................... G06T 15/40 345/421 |
| 2008/0231633 | A1 | * | 9/2008 | Keller ....................... G06T 1/60 345/426 |

(Continued)

FOREIGN PATENT DOCUMENTS

| KR | 10-2009-0020924 A | 2/2009 |
|----|-------------------|--------|
| KR | 10-2011-0136059 A | 12/2011 |

OTHER PUBLICATIONS

J. Mahovsky et al., "Fast Ray-Axis Aligned Bounding Box Overlap Tests with Plücker Coordinates," *Journal of Graphics Tools*, vol. 9, No. 1, 2004, pp. 35-46.

(Continued)

*Primary Examiner* — Thomas Lett
(74) *Attorney, Agent, or Firm* — NSIP Law

(57) ABSTRACT

A method of processing ray tracing comprising acquiring information about a light source and a bounding box that are located in a three-dimensional graphics (3D) graphics environment, the bounding box containing an object; testing whether a ray generated by the light source intersects the bounding box along each of first to third coordinate axes that define the 3D graphics environment based on the acquired information; and rendering the object in response to a result of the testing being that the ray intersects the bounding box along all of the first through third coordinate axes.

20 Claims, 11 Drawing Sheets

(56) References Cited

U.S. PATENT DOCUMENTS

| | | | | |
|---|---|---|---|---|
| 2009/0256845 A1* | 10/2009 | Sevastianov | ............ | G06T 15/40 |
| | | | | 345/426 |
| 2013/0016109 A1* | 1/2013 | Garanzha | ................ | G06T 15/06 |
| | | | | 345/501 |
| 2014/0306959 A1* | 10/2014 | Ozdas | .................... | G06T 15/06 |
| | | | | 345/424 |

OTHER PUBLICATIONS

A. Williams et al. "An Efficient and Robust Ray-Box Intersection Algorithm," *Proceedings of the 32nd International Conference on Computer Graphics and Interactive Techniques* (*SIGGRAPH 2005*), Jul. 31, 2005, pp. 1-4, ACM, New York, conference held Jul. 31-Aug. 4, 2005, Los Angeles, paper presented as Article No. 9 as part of course "Introduction to Real-Time Ray Tracing" held on Aug. 3, 2005.

M. Eisemann et al., "Fast Ray/Axis-Aligned Bounding Box Overlap Tests using Ray Slopes," *Journal of Graphics Tools*, vol. 12, No. 4, Dec. 2007, pp. 35-46 (preprint copy dated Jan. 8, 2008, 21 pages).

\* cited by examiner

FIG. 9

Smin = (BB.xmin – Ray.orgs)*Ray.dirs
Smax = (BB.xmax – Ray.orgs)*Ray.dirs — 910

Min(Smin, Smax) — 920

_max = Min of max (max, max_t), _min = Max of min (min, min_t) — 930

Intersection? (_min <= _max) && (Ray$_{t-1}$.id == Ray$_t$.id), update max_t = _max, min_t = _min — 940

```
if (Ray.Dir > 0) {
    if (Ray.Org > BB.Xmax) return false;
}
```
—1410

```
else
{
    if (Ray.Org < BB.Xmin) return false;
}
```
—1420

METHOD AND APPARATUS PROCESSING RAY BOUNDING BOX INTERSECTION

CROSS-REFERENCE TO RELATED APPLICATIONS

This application claims the benefit of Korean Patent Application No. 10-2014-0081219 filed on Jun. 30, 2014, in the Korean Intellectual Property Office, the disclosure of which is incorporated herein in its entirety by reference.

BACKGROUND

1. Field

This disclosure relates to methods and apparatuses for processing ray tracing that are capable of performing a ray-box intersection test during traversal of a space division acceleration structure.

2. Description of Related Art

Three-dimensional (3D) rendering is an image processing process for synthesizing data of a 3D object into an image that may be seen at a given viewpoint of a camera.

Rasterization and ray tracing are two representative rendering approaches. In rasterization, an image is generated by projecting a 3D object onto a screen. Ray tracing is a technique for generating an image by tracing a path of light incident along a ray that is emitted from a viewpoint of a camera toward each pixel of an image.

Ray tracing is capable of producing a high quality image by simulating physical properties of light such as reflection, refraction, transmission, etc. However, since this technique requires a significant amount of calculation, it is difficult to perform high-speed rendering.

Ray tracing includes traversal of an acceleration structure and a ray-primitive intersection test. In this case, the traversal and the intersection test require a large amount of computation and a high bandwidth.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of processing ray tracing includes acquiring information about a light source and a bounding box that are located in a three-dimensional (3D) graphics environment, the bounding box containing an object; testing whether a ray generated by the light source intersects the bounding box along each of first through third coordinate axes that define the 3D graphics environment based on the acquired information; and rendering the object in response to a result of the testing being that the ray intersects the bounding box along all of the first through third coordinate axes.

The testing of whether the ray intersects the bounding box may include performing an intersection test between the ray and the bounding box along each of the first through third coordinate axes in an order from the first to third coordinate axes.

The testing of whether the ray intersects the bounding box may include testing whether the bounding box is a closest bounding box to the light source; and determining that the bounding box is the closest bounding box to the light source in response to a result of the testing of whether the ray intersects the bounding box being that the ray intersects the bounding box along all of the first through third coordinate axes.

The testing of whether the ray intersects the bounding box may include sequentially testing whether the ray intersects the bounding box along the first through third coordinate axes; and determining that the ray does not intersect the bounding box in response to a result of the sequentially testing being that the ray does not intersect the bounding box along one of the first through third coordinate axes.

The bounding box may be one of a plurality of bounding boxes each containing a respective object; and the testing of whether the ray intersects the bounding box may include sequentially testing whether the ray intersects each of the plurality of bounding boxes along each of the first through third coordinate axes; and determining that one of the bounding boxes currently determined to be intersected by the ray along all of the first through third coordinate axes is closer to the light source than another one of the bounding boxes previously determined to be intersected by the ray along all of the first through third coordinate axes.

The testing of whether the ray intersects the bounding box may include calculating intersection points between the bounding box and the ray along one single axis among the first through third coordinate axes; determining a minimum value between a maximum value among the calculated intersection points and a preset first reference value; determining a maximum value between a minimum value among the calculated intersection points and a preset second reference value; determining that the bounding box is intersected by the ray along the one single axis in response to the determined maximum value being less than or equal to the determined minimum value; and determining that the bounding box is not intersected by the ray along the one single axis in response to the determined maximum value being greater than the determined minimum value.

The testing of whether the ray intersects the bounding box further may include updating the preset first and second reference values to the determined minimum and maximum values, respectively, in response to the determined maximum value being less than or equal to the determined minimum value.

The bounding box may be an axis-aligned bounding box.

The testing of whether the ray intersects the bounding box further may include determining whether the ray intersects the bounding box using property information of the ray.

The property information of the ray may include information about an origin and a direction of the ray.

In another general aspect, a non-transitory computer-readable storage medium stores instructions for controlling a computer to perform the method described above.

In another general aspect, an apparatus for processing ray tracing includes an intersection testing unit configured to test, based on information about a light source and a bounding box that are located in a three-dimensional (3D) graphics environment, the bounding box containing an object, whether a ray generated by the light source intersects the bounding box along each of first through third coordinate axes that define the 3D graphics environment; and a rendering unit configured to render the object in response to the intersection testing unit determining that the ray intersects the bounding box along all of the first through third coordinate axes.

The intersection testing unit may be further configured to test whether the ray intersects the bounding box along each of the first through third coordinate axes in an order from the first to third coordinate axes.

The intersection testing unit may be further configured to test whether the bounding box is a closest bounding box to the light source; and determine that the bounding box is the closest bounding box to the light source in response to the intersection testing unit determining that the ray intersects the bounding box along all of the first through third coordinate axes.

The intersection testing unit may be further configured to sequentially test whether the ray intersects the bounding box along the first through third coordinate axes; and determine that the bounding box is not intersected by the ray in response to the intersection testing unit determining that the bounding box is not intersected by the ray along one of the first through third coordinate axes.

The bounding box may be one of a plurality of bounding boxes each containing a respective object; and the intersection testing unit may be further configured to sequentially test whether the ray intersects each of the plurality of bounding boxes along each of the first through third coordinate axes; and determine that one of the bounding boxes currently determined to be intersected by the ray along all of the first through third coordinate axes is closer to the light source than another one of the bounding boxes previously determined to be intersected by the ray along all of the first through third coordinate axes.

The intersection testing unit may include a first arithmetic unit configured to calculate intersection points between the bounding box and the ray along one single axis among the first through third coordinate axes; and a second arithmetic unit configured to determine a minimum value between a maximum value among the calculated intersection points and a preset first reference value; and determine a maximum value between a minimum value among the calculated intersection points and a preset second reference value; and the intersection testing unit may be further configured to determine that the bounding box is intersected by the ray along the one single axis in response to the second arithmetic unit determining that the determined maximum value is less than or equal to the determined minimum value; and determine that that the bounding box is not intersected by the ray along the one single axis in response to the second arithmetic unit determining that the determined maximum value is greater than the determined minimum value.

The intersection testing unit may be further configured to update the preset first and second reference values to the determined minimum and maximum values, respectively, in response to the intersection unit determining that the determined maximum value is less than or equal to the determined minimum value.

The intersection testing unit further may include a preprocessing filter configured to determine whether the ray intersects the bounding box using property information of the ray.

The property information of the ray may include information about an origin and a direction of the ray.

Other features and aspects will be apparent from the following detailed description, the drawings, and the claims.

BRIEF DESCRIPTION OF THE DRAWINGS

FIG. 9 illustrates an example of the method of performing a ray-box intersection test along a single axis illustrated in FIG. 8 described by code.

DETAILED DESCRIPTION

Figure 1:
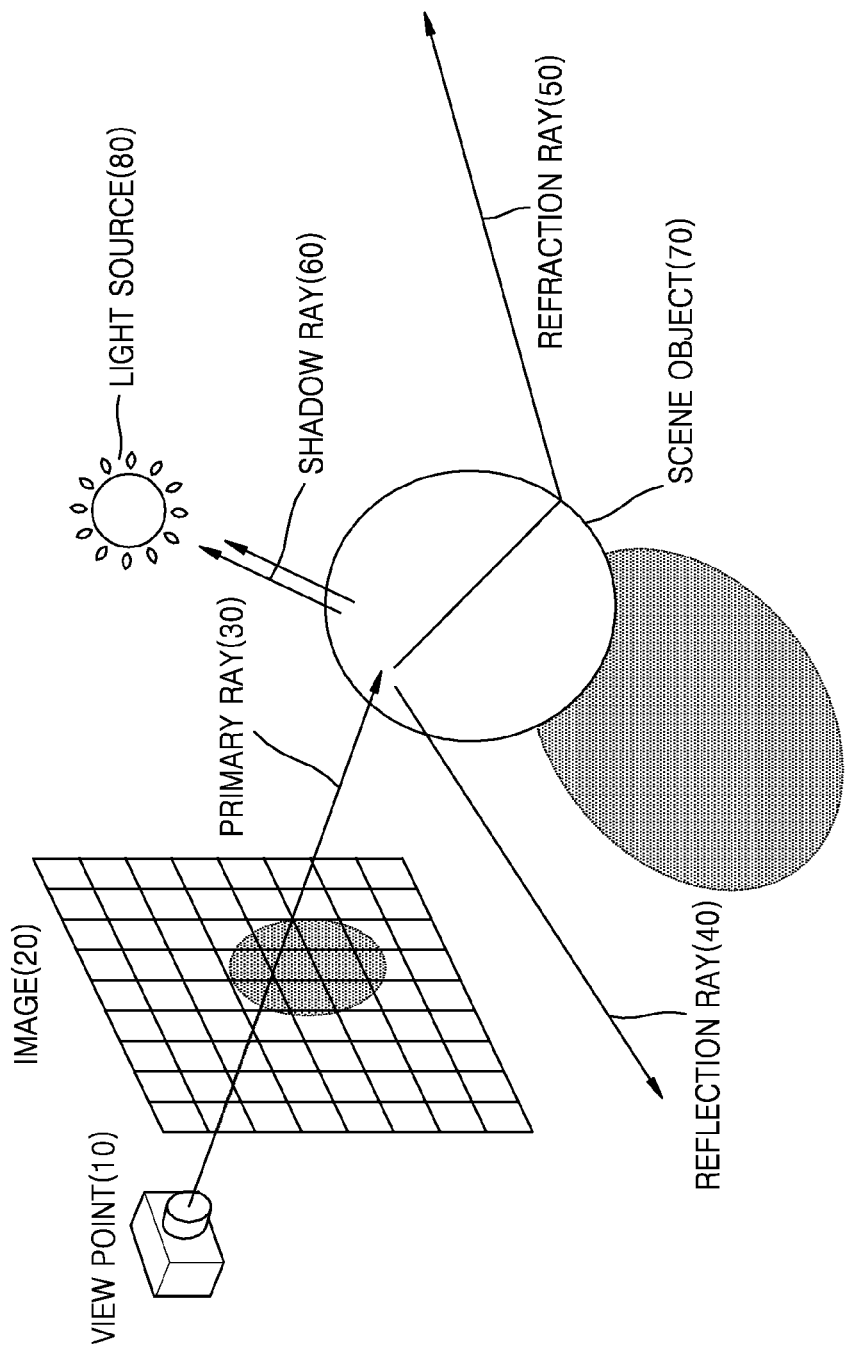
FIG. 1 is a diagram for explaining an example of a ray tracing method.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," when used in this specification, specify the presence of stated elements, components, steps, and/or operations, but do not preclude the presence or addition of one or more other elements, components, steps, and/or operations.

Furthermore, it will be understood that although the terms "first," "second," etc., may be used herein to describe various elements and/or components, these elements and/or components are not to be limited by these terms. These terms are only used to distinguish one element or component from another element or component.

FIG. 1 is a diagram for explaining an example of a ray tracing method. Referring to FIG. 1, in three-dimensional (3D) modeling, an apparatus for processing ray tracing (hereinafter referred to as a 'ray tracing processing apparatus') determines a view point 10 and determines an image 20 according to the view point 10. When the view point 10 and the image 20 are determined, the ray tracing processing apparatus generates a ray for each pixel in the image 20 for emission from the view point 10.

Referring to FIG. 1, a primary ray 30 is emitted from the view point 10 and then passes through the image 20 to intersect a scene object 70. A reflection ray 40 and a refraction ray 50 are generated at an intersection point between the primary ray 30 and the scene object 70. A shadow ray 50 is also emitted from the intersection point toward a light source 80. In this case, the reflection ray 40, the refraction ray 50, and the shadow ray 60 are called secondary rays. The scene object 70 may be composed of a set of fundamental unit regions (hereinafter referred to as 'primitives'). A primitive may be a polygon such as a triangle or a rectangle. In other words, a primitive may be a basic unit region capable of having rendering performed thereon.

The ray tracing processing apparatus analyzes the primary ray 30, the secondary rays 40, 50, and 60, and other rays derived from the second rays 40, 50, and 60. The ray tracing processing apparatus also determines color values for pixels in the image 20 based on result of the analysis and in consideration of properties of the scene object 70.

Figure 2:
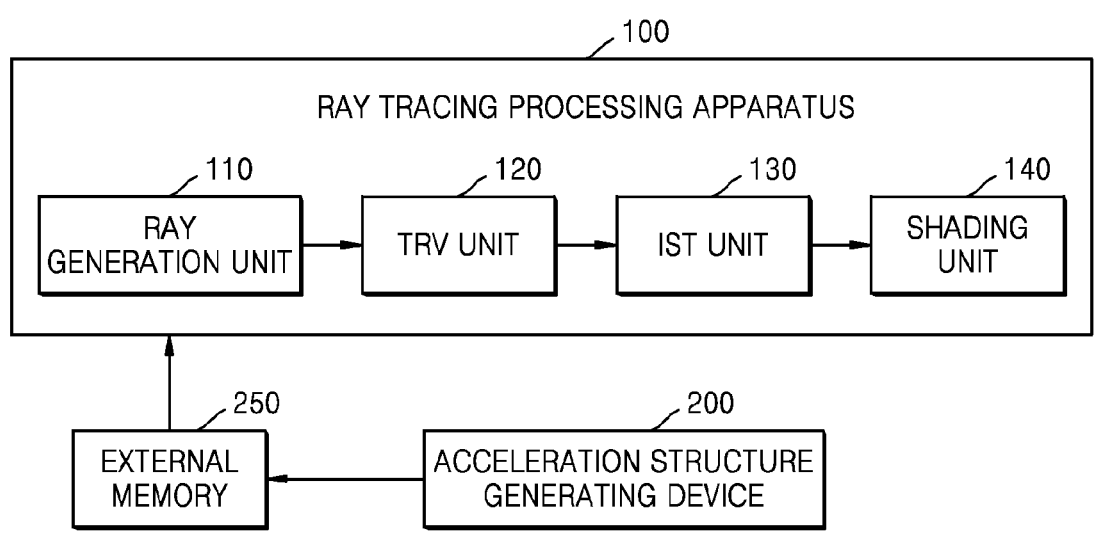
FIG. 2 illustrates an example of a configuration of a ray tracing processing apparatus.

FIG. 2 illustrates an example of a configuration of a ray tracing processing apparatus 100. Referring to FIG. 2, the ray tracing processing apparatus 100 includes a ray generation unit 110, a traversal (TRV) unit 120, an intersection (IST) unit 130, and a shading unit 140. Although FIG. 2 shows that the ray tracing processing apparatus 100 includes the TRV unit 120 and the IST unit 120, the TRV unit 120 and the IST unit 130 may be implemented using separate hardware. Since the ray tracing processing apparatus 100 includes only components related to this example, it will be understood by one of ordinary skill in the art that the ray tracing processing apparatus 100 may further include other common components in addition to those illustrated in FIG. 2.

The ray tracing processing apparatus 100 traces intersection points between rays generated by a light source and objects in a 3D space and determines color values for pixels in an image. In other words, the ray tracing processing apparatus 100 finds intersection points between rays and objects, generates secondary rays according to the properties of an object at an intersection point, and determines a color value of the intersection point.

Due to a tremendous amount of computation required for finding intersection points between rays and objects or a plurality of primitives in the objects, the ray tracing processing apparatus 100 accelerates the process of finding intersection points by hierarchically subdividing a 3D space. Furthermore, to accelerate the process of finding intersection points, the ray tracing processing apparatus 100 first performs an intersection test using a bounding volume that has a simple geometrical shape, contains an object or primitive, and is included in a decomposed hierarchical space. Hereinafter, it is assumed that the bounding volume is a bounding box, and thus the intersection test is referred to as a ray-box intersection test. After performing a ray-box intersection test, the ray tracing processing apparatus 100 calculates an intersection point between a ray and an object or primitive enclosed in a box intersected by the ray.

When the ray tracing processing apparatus 100 performs a ray-box intersection test using property information of a ray such as a ray direction or a ray origin. In other words, an intersection test may be performed without specific calculations by comparing coordinates of an object with a ray direction or ray origin. The ray tracing processing apparatus 100 may perform a faster intersection test using property information of a ray as described in greater detail below with reference to FIGS. 12 through 14.

The ray generation unit 110 generates primary and secondary rays. The ray generation unit 110 generates a primary ray from a view point and secondary rays at an intersection point between the primary ray and an object. The ray generation unit 110 may also generate another secondary ray at an intersection point between a secondary ray and an object. The other secondary ray may be a reflection ray, a refraction ray, or a shadow ray. The ray generation unit 110 may generate reflection, refraction, and shadow rays a predetermined number of times, or may determine the number of times that reflection, refraction, and shadow rays are generated according to the properties of an object.

The TRV unit 120 receives information about rays generated by the ray generation unit 110. The rays may include all of a primary ray, secondary rays, and rays derived from the secondary rays. For example, if the generated ray is a primary ray, the TRV unit 120 receives information about a view point and a direction of the primary ray. If the generated ray is a secondary ray, the TRV unit 120 receives information about a starting point and a direction of the secondary ray. The starting point of the secondary ray may be a point of a primitive hit by the primary ray. A view point or a starting point may be represented by coordinates, and a direction may be expressed as a vector.

The TRV unit 120 reads information about an acceleration structure from an external memory 250. The acceleration structure is generated by an acceleration structure generating device 200 and then stored in the external memory 250. The acceleration structure is a space division structure obtained by subdividing a 3D space into hierarchical regions, i.e., a structure containing position information of objects in the 3D space. Examples of the acceleration structure include a k-dimensional (kd) tree and a Bounding Volume Hierarchy (BVH) that represent relationships between objects in a 3D space.

Figure 3:
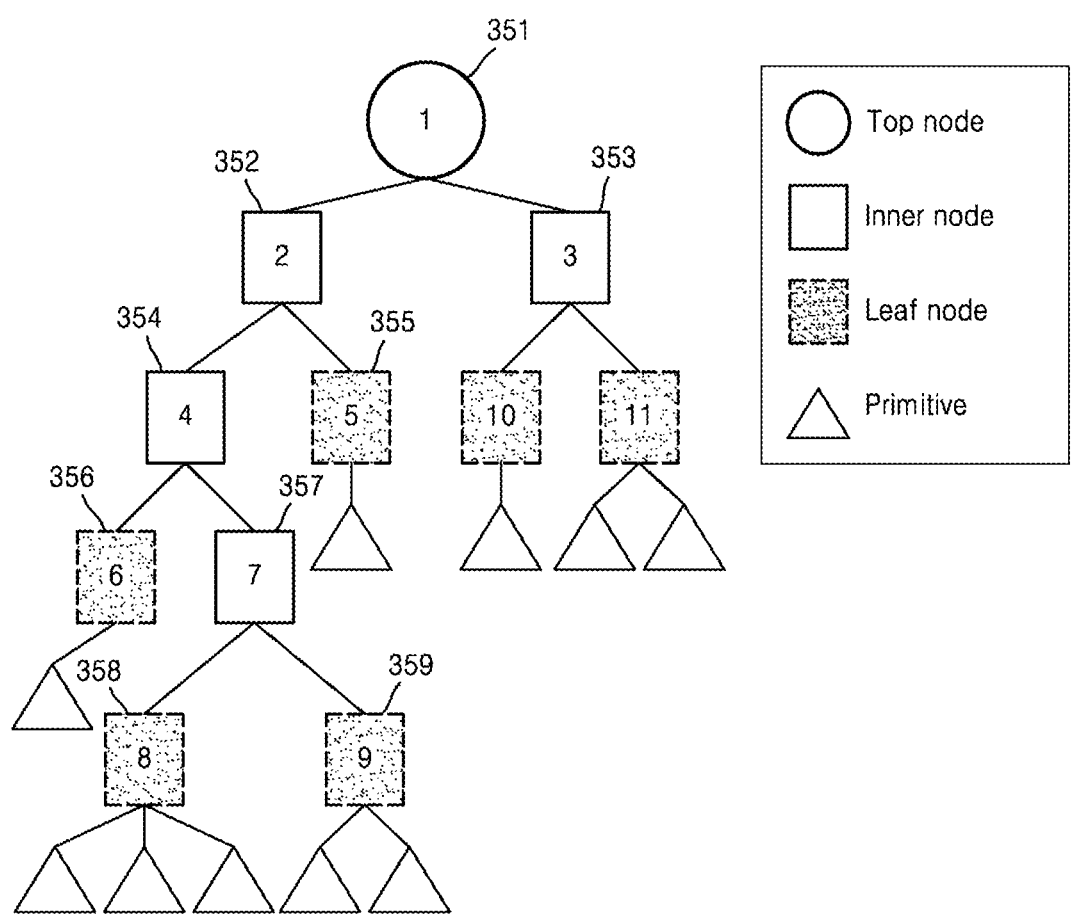
FIG. 3 is a diagram for explaining an example of an acceleration structure.

FIG. 3 is a diagram for explaining an example of an acceleration structure.

Hereinafter, for convenience of explanation, a numeral inscribed in each node in the acceleration structure is used to denote the node. For example, a circular node labeled with a number 1, a quadrangular node labeled with a number 2, and a dashed quadrangular node labeled with a number 5 are referred to as a first node 351, a second node 352, and a fifth node 355, respectively.

The acceleration structure includes a top node, inner nodes, leaf nodes, and primitives.

Referring to FIG. 3, the first node 351 is a top node. A top node is an uppermost node having no upper node but only lower nodes. For example, the first node 351 has no upper node but has two lower nodes, the second and third nodes 352 and 353.

The second node 352 is an inner node having both upper and lower nodes. For example, the second node has the first node 351 as an upper node and fourth and fifth nodes 354 and 355 as lower nodes.

Furthermore, an eighth node 358 is a leaf node. A leaf node is a lowermost node having an upper node but no lower nodes. For example, the eighth node 358 has a seventh node 357 as an upper node but no lower nodes.

The leaf node may contain primitives. For example, as shown in FIG. 3, a sixth node 356 that is a leaf node contains a single primitive. The eighth node 358 and a ninth node 359, which are also leaf nodes, respectively contain three primitives and two primitives.

Furthermore, in one example, each node described above may be an object or a bounding box containing objects.

The TRV unit 120 performs an intersection test between a ray and each node while traversing an acceleration structure. For example, the intersection test may be a ray-box intersection test. In one example, a ray-box intersection test may be a collision test between a ray and an Axis-Aligned Bounding Box (AABB) or an Oriented Bounding Box (OBB). A slab method may be used to perform calculations needed for a ray-box intersection test, but this example is not limited thereto. A collision test between a ray and an AABB according to one example will be described in detail below with reference to FIG. 6.

The TRV unit 120 may also determine whether a ray intersects a bounding box using property information such as an origin or direction of the ray. In one example, the TRV unit 120 determines that a ray does not intersect a bounding box using only two components of the ray, such as an origin and a direction.

The IST unit 130 receives a bounding box hit by a ray from the TRV unit 120. The IST unit 130 reads information about primitives contained in a hit bounding box from the external memory 250.

The IST unit 130 performs a ray-primitive intersection test to output a primitive hit by a ray and an intersection point between the primitive and the ray. The IST unit 130 also receives an object that is hit by a ray from the TRV unit 120 and tests which one of a plurality of primitives in the object is hit by the ray. The IST unit 130 also searches for a primitive hit by a ray and outputs an intersection point indicating a point of the hit primitive intersected by the ray. The intersection point may be output to the shading unit 140 as coordinates.

The shading unit 140 determines a color value of a pixel based on information about an intersection point received from the IST unit 130 and material properties of the intersection point. The shading unit 140 determines a color value of a pixel in consideration of a fundamental color of a material of an intersection point, an effect obtained by emitting light from a light source, etc.

The shading unit 140 also generates secondary rays based on material information of an intersection point. Since optical phenomena such as reflection and refraction vary according to properties of a material, the shading unit 140 generates secondary rays such as a reflection ray and a refraction ray according to the properties of a material. Furthermore, the shading unit 140 generates a shadow ray based on a position of a light source.

The ray tracing processing apparatus 100 receives data necessary for ray tracing from the external memory 250. The external memory 250 is used to store an acceleration structure or geometry data. As described above, the acceleration structure is generated by the acceleration structure generating device 200 and is stored in the external memory 250. The geometry data represents information about primitives. A primitive may be a polygon such as a triangle or a quadrangle, and the geometry data may describe information about vertices and positions of primitives.

The acceleration structure generating device 200 generates an acceleration structure including position information of objects in a 3D space. In other words, the acceleration structure generating device 200 subdivides a 3D space into a hierarchical tree structure. The acceleration structure generating device 200 may generate various types of acceleration structures. For example, the acceleration structure generating device 200 may generate acceleration structures that describe a relationship between objects in a 3D space by applying a BVH or kd tree. The acceleration structure generating device 200 may determine a maximum number of primitives at a leaf node and a tree depth, and generate an acceleration structure based on a determination result.

Figure 4:
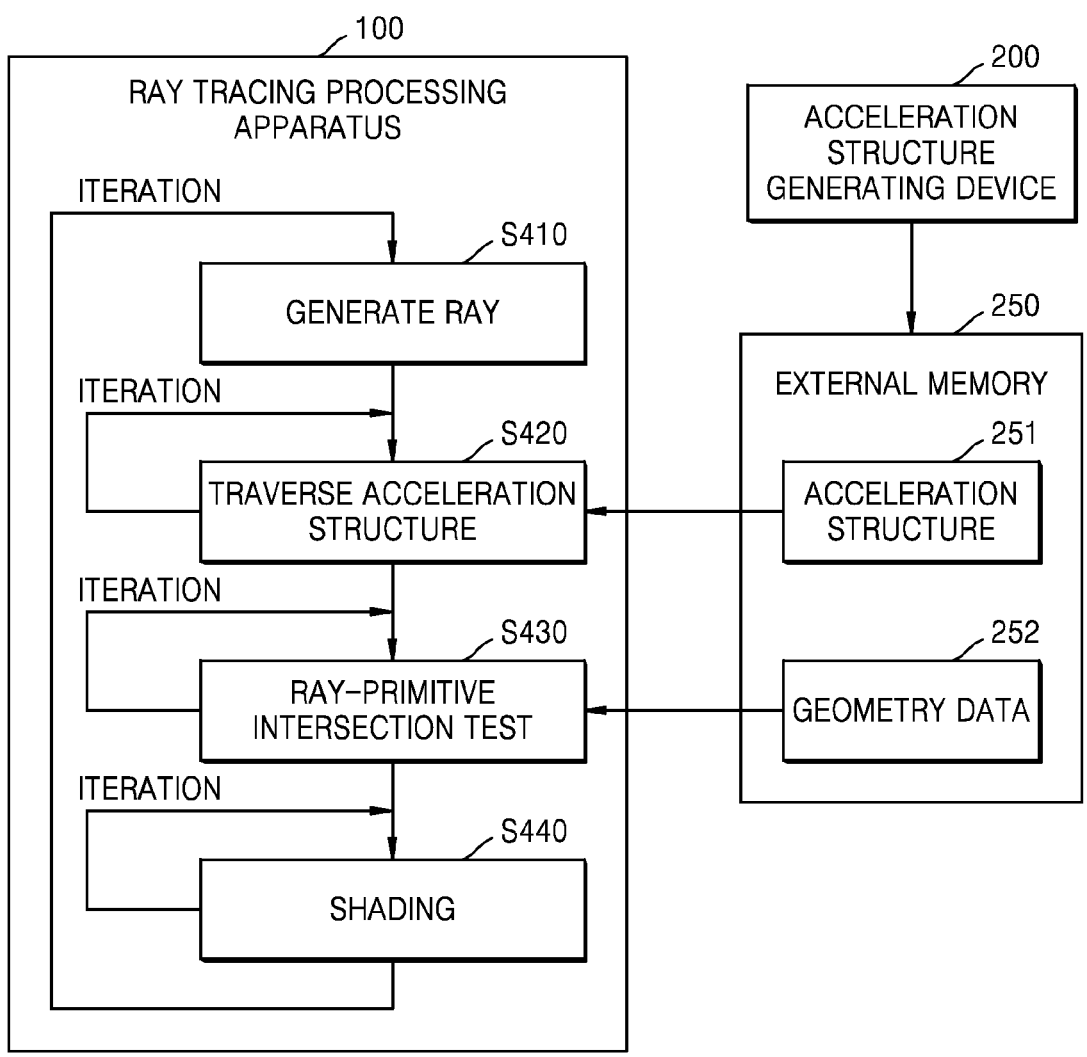
FIG. 4 illustrates an example of a ray tracing processing method performed by the ray tracing processing apparatus of FIG. 2.

FIG. 4 illustrates an example of a ray tracing processing method performed by the ray tracing processing apparatus 100 of FIG. 2. Thus, the descriptions with respect to the ray tracing processing apparatus 100 of FIG. 2 are also applicable to the ray tracing processing method of FIG. 4.

Referring to FIGS. 2 and 4, the ray tracing processing apparatus 100 generates rays (S410). The rays may include a primary ray generated from a view point, and rays generated by the primary ray.

The ray tracing processing apparatus 100 reads an acceleration structure from the external memory 250 and traverses the acceleration structure based on the generated ray (S420). During the traversal, the ray tracing processing apparatus 100 detects a bounding box of a leaf node or a primitive intersected by the ray. The ray tracing processing apparatus 100 continues to traverse the acceleration structure until it detects a bounding box of a leaf node or a primitive intersected by the ray. In one example, the ray tracing processing apparatus 100 performs a ray-box intersection test to find a bounding box of a leaf node or a primitive.

The ray tracing processing apparatus 100 traverses an acceleration structure along one path, and if a ray does not intersect a leaf node on the path, then traverses the acceleration structure along another path.

For example, referring to FIG. 3, the ray tracing processing apparatus 100 may start a traversal from the second or third node 352 or 353 that is a lower node of the first node 351. If the traversal starts from the second node 352, the ray tracing processing apparatus 100 stores information about the third node 353, which may be stored in a separate memory.

The ray tracing processing apparatus 100 determines whether a ray intersects the second node 352, and if the ray intersects the second node 352, then performs traversal on one of the fourth and fifth nodes 354 and 355 that are lower nodes of the second node 352.

If the traversal is performed on the fourth node 354 in order to determine whether a ray intersects the fourth node 354, the ray tracing processing apparatus 100 stores information about the other node, i.e., the fifth node 355, in the separate memory.

If the ray intersects the fourth node 354, the ray tracing processing apparatus 100 performs traversal on one of sixth and seventh nodes 356 and 357 that are lower nodes of the fourth node 354.

If the traversal is performed on the sixth node 356 in order to determine whether a ray intersects the sixth node 356, the ray tracing processing apparatus 100 stores information about the other node, i.e., the seventh node 357, in the separate memory.

If the ray intersects the sixth node 356, the ray tracing processing apparatus 100 detects the sixth node 356 as a leaf node.

In this way, the ray tracing processing apparatus 100 detects a leaf node by performing traversal along one path while storing information about a node on another path in a separate memory. After completing the traversal along the path, the ray tracing processing apparatus 100 resumes traversal from a node whose information was last stored.

For example, after detecting the sixth node 356 as a leaf node, the ray tracing processing apparatus 100 resumes traversal from the seventh node 357 whose information was last stored.

Thus, after completing traversal along one path, the ray tracing processing apparatus 100 performs traversal from a node on a path closest to the one path, rather than from a top node, thereby reducing the amount of computation. Furthermore, the above-described intersection test for each node may be performed using a ray-box intersection test as described in greater detail below with reference to FIGS. 5 through 14. Using a ray-box intersection test may also reduce the amount of computation.

The ray tracing processing apparatus 100 transmits the detected leaf node or bounding box to the IST unit 120.

The ray tracing processing apparatus 100 tests whether a primitive contained in the detected leaf node or bounding box is intersected by a ray.

In this case, the ray tracing processing apparatus 100 reads geometry data 252 that is information about primitives from the external memory 250 and performs an intersection test between a ray and a primitive, i.e., a ray-primitive intersection test, using the read information about primitives (S430).

The ray tracing processing apparatus 100 tests which one of primitives in a leaf node or bounding box received from the TRV unit 120 is intersected by a ray.

For example, if the detected leaf node includes three primitives (e.g., first through third primitives), the ray tracing processing apparatus 100 performs intersection tests between a ray and the first primitive, the ray and the second primitive, and the ray and the third primitive, thereby finding a primitive intersected by the ray.

In this way, the ray tracing processing apparatus 100 detects primitives intersected by rays and calculates hit points where the rays intersect the detected primitives.

The ray tracing processing apparatus 100 performs shading on a pixel based on an intersection test result (S440). While doing so, the ray tracing processing apparatus 100 determines a color value of a pixel based on information about an intersection point and material properties of the intersection point.

After completing operation S440, the ray tracing processing apparatus 100 returns to operation S410. After shading the pixel, the ray tracing processing apparatus 100 performs operations S410 through S440 iteratively in order to shade another pixel. In this way, the ray tracing processing apparatus 100 performs operations S410 through S440 iteratively on all pixels in an image.

Figure 5:
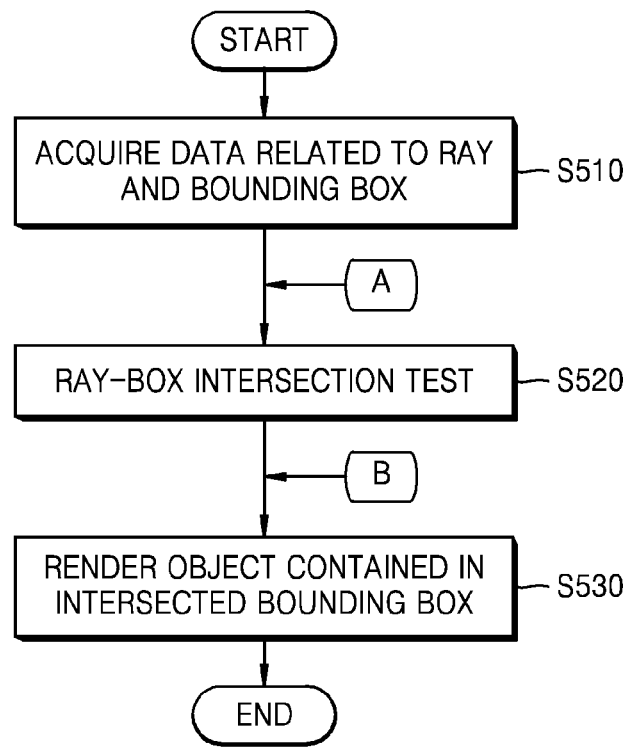
FIG. 5 illustrates an example of a ray tracing processing method that is another aspect of the ray tracing processing method of FIG. 4.

FIG. 5 illustrates an example of a ray tracing processing method that is another aspect of ay tracing processing method of FIG. 4.

Referring to FIGS. 2 and 5, the ray tracing processing apparatus 100 acquires information about a ray generated by a light source 80 and a plurality of bounding boxes, each of which contains one of a plurality of objects (S510). The information about a ray may include a view point and a direction of the ray. The information about the ray and the information about the plurality of bounding boxes are received from the ray generation unit 110 and the external memory 250, respectively.

The ray tracing processing apparatus 100 performs an intersection test between a ray and a bounding box (S520). The intersection test may be performed sequentially on each of the plurality of bounding boxes. Furthermore, the intersection test may be performed along each of three coordinate axes, i.e., first through third coordinate axes, that define a 3D graphics environment. The intersection test may also be performed along each of the first through third coordinate axes in an order from first to third axes. An intersection test performed for each of the bounding boxes will be described in greater detail later with reference to FIGS. 7 and 8.

When a bounding box intersected by a ray is detected in operation S520, the ray tracing processing apparatus 100 performs rendering on an object contained in the detected bounding box (S530). The rendering includes the ray-primitive intersection test (S430) and the shading (S440).

Figure 6:
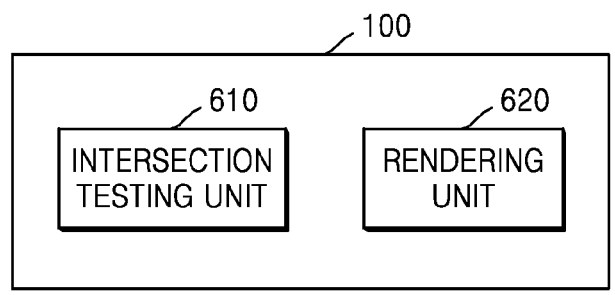
FIG. 6 illustrates an example of a configuration of a ray tracing processing apparatus for performing the ray tracing processing method of FIG. 5.

FIG. 6 illustrates an example of a configuration of a ray tracing processing apparatus 100 for performing the ray tracing processing method of FIG. 5.

In this example, referring to FIGS. 5 and 6, the ray tracing processing apparatus 100 includes an intersection testing unit 610 and a rendering unit 620. The intersection testing unit 610 tests whether a ray generated by a light source intersects a bounding box along each of three coordinate axes that define a 3D graphics environment based on information about the light source and a bounding box containing an object in the 3D graphics environment. If the ray intersects the bounding box on all of the three coordinate axes, the rendering unit 620 renders an object contained in the bounding box.

In one example, the intersection testing unit 610 performs operations S510 and S520 illustrated in FIG. 5, and the rendering unit 620 performs operation S530 illustrated in FIG. 5.

In one example, the intersection testing unit 610 functions as the TRV unit 120 and the IST unit 130 shown in FIG. 2, and the rendering unit 620 functions as the shading unit 140 shown in FIG. 2.

Figure 7:
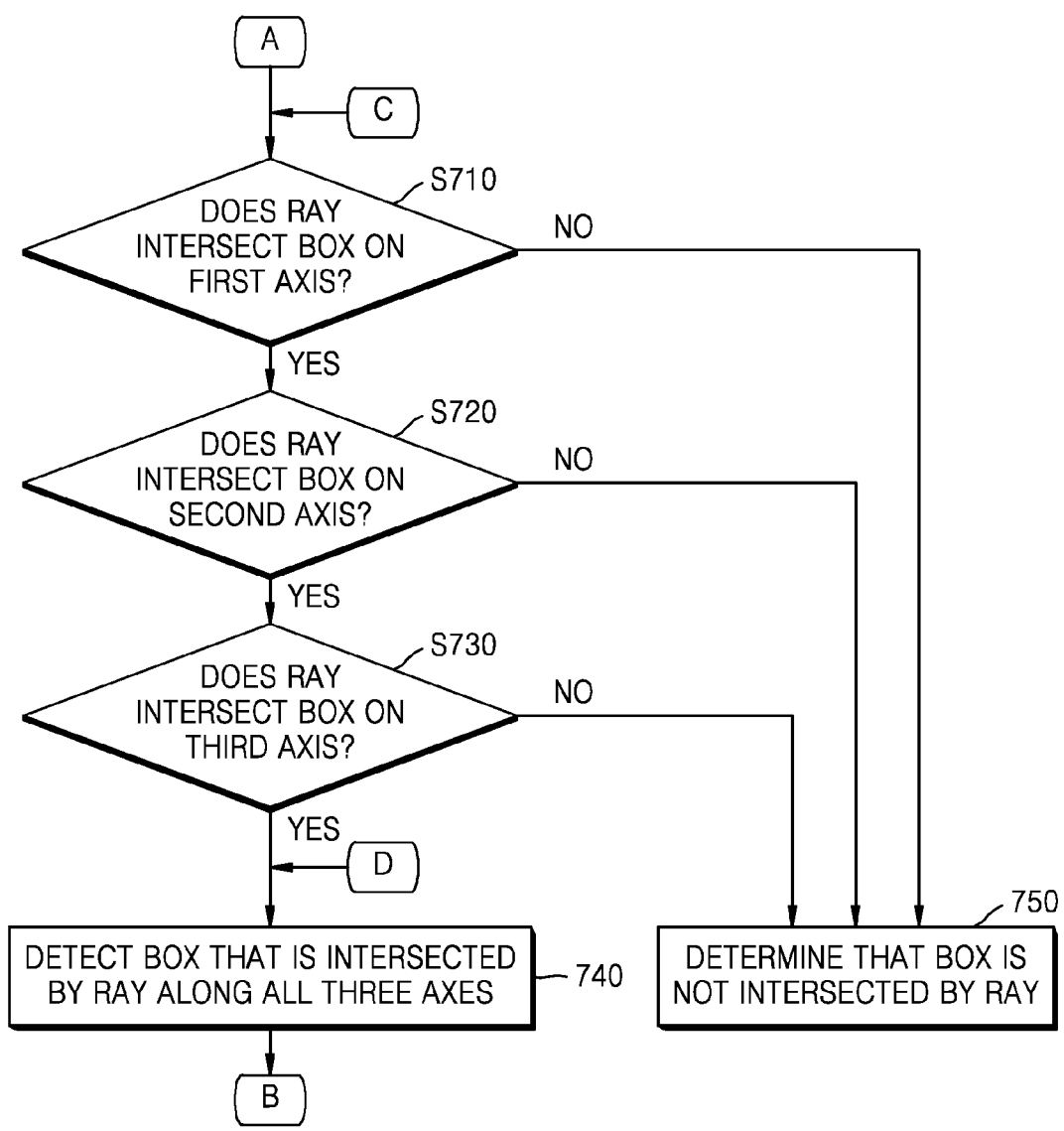
FIG. 7 illustrates an example of an operation S520 of performing a ray-box intersection test of FIG. 5.

FIG. 7 illustrates an example of operation S520 of performing a ray-box intersection test of FIG. 5.

In operation S520 of performing a ray-box intersection test, the ray-box intersection test is not performed along three coordinate axes of a spatial coordinate system that define a 3D graphics environment in a concurrent or parallel manner. Rather, the ray-box intersection test is performed along first through third coordinate axes in a sequential manner. Thus, ray-bounding box intersection tests are performed sequentially along single x-, y-, and z-axes. In other words, intersection tests between each of x, y, and z components of a ray and a bounding box are performed sequentially.

The ray tracing processing apparatus 100 performs an intersection test between a ray and a bounding box along a first coordinate axis (S710). A method of performing the intersection test will be described in greater detail below with reference to FIG. 8. If the ray intersects the bounding box on the first coordinate axis, the ray tracing processing apparatus 100 proceeds to operation S720. If the ray does not intersect the bounding box on the first coordinate axis, the ray tracing processing apparatus 100 determines that the ray does not intersect the bounding box (S750).

If the ray intersects the bounding box on the first coordinate axis, the ray tracing processing apparatus 100 then performs an intersection test between the ray and the bounding box along a second coordinate axis (S720). A method of performing the intersection test will be described in greater detail below with reference to FIG. 8. If the ray intersects the bounding box on the second coordinate axis, the ray tracing processing apparatus 100 proceeds to operation S730. If the ray does not intersect the bounding box on the second coordinate axis, the ray tracing processing apparatus 100 determines that the ray does not intersect the bounding box (S750).

If the ray intersects the bounding box on the second coordinate axis, the ray tracing processing apparatus 100 then performs an intersection test between the ray and the bounding box along a third coordinate axis (S730). A method of performing the intersection test will be described in greater detail below with reference to FIG. 8. If the ray intersects the bounding box on all of the first through third coordinate axes, the ray tracing processing apparatus 100 detects the bounding box (S740) and performs operation S530 illustrated in FIG. 5 on the bounding box. If the ray does not intersect the bounding box on all of the first through third coordinate axes, the ray tracing processing apparatus 100 determines that the ray does not intersect the bounding box (S750).

Figure 8:
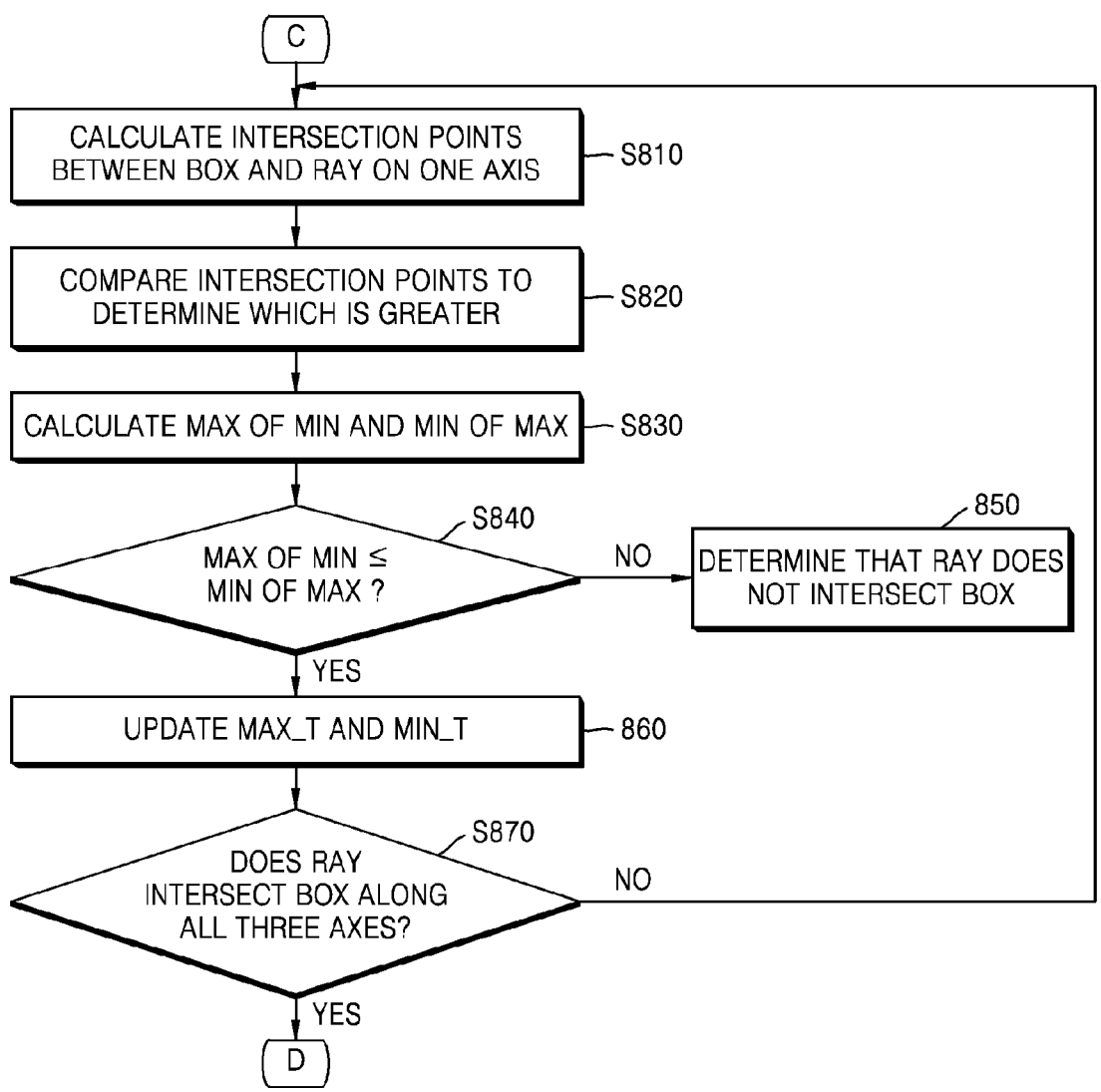
FIG. 8 illustrates an example of a method of performing a ray-box intersection test along a single axis illustrated in FIG. 7.

FIGS. 8 and 9 illustrate an example of a method of performing a ray-box intersection test along a single axis illustrated in FIG. 7. In other words, in operations S710, S720, and S730 in FIG. 7, a ray-box intersection test may be performed sequentially along first through third single axes using the method of FIG. 8.

A bounding box may be an AABB or OBB, but is not limited thereto. It is assumed hereinafter that the bounding box is an AABB (hereinafter referred to as a 'box').

A ray-box intersection test described below is performed using a slab method, but is not limited thereto. The slab method includes, if an intersection of three slabs on three coordinate axes (e.g., x, y, and z axes) of a 3D spatial coordinate system defines a box, computing maximum or minimum values of intersection points between each of the three slabs and a ray and determining whether the ray intersects the box by comparing the maximum or minimum values to determine which is greater or smaller. Furthermore, in order to determine whether the ray intersects the box, the slab method is performed sequentially along single x, y, and z axes, and not along x, y, and z axes in a concurrent or parallel manner. Thus, according to this example, ray-bounding box intersection tests are performed sequentially along single x-, y-, and z-axes. In other words, intersection tests between each of x, y, and z components of a ray and a bounding box are performed sequentially.

Referring to FIGS. 6 through 8, the ray tracing processing apparatus 100 calculates intersection points Smin and Smax between an input ray and a box on a single axis of x-, y-, and z-axes (S810). If the single axis is an x-axis, the ray tracing processing apparatus 100 calculates intersection points between a ray on the x-axis and both minimum and maximum x-coordinate values of a box. If operation S810 is described by code, it may be represented by a region 910 enclosed by a dashed line in FIG. 9.

The ray tracing processing apparatus 100 distinguishes maximum and minimum values among the intersection points Smin and Smax calculated in operation S810 by comparing the intersection points Smin and Smax to determine which is greater (S820). It is assumed hereinafter that the maximum and minimum values are denoted by min and max, respectively. For example, if Smax is greater than Smin, then min=Smin and max=Smax. Conversely, if Smin is greater than Smax, then min=Smax and max=Smin. If operation S820 is described by code, it may be represented by a region 920 enclosed by a dashed line in FIG. 9.

The ray tracing processing apparatus 100 calculates a minimum value Max of min (_min) and a maximum value Min of max (_max) (S830). In greater detail, the ray tracing processing apparatus 100 calculates a minimum value Max of min (_min) by comparing the minimum value min of Smin and Smax determined in operation S820 with a preset value min_t and selecting a bigger one of the two, and calculates a maximum value Min of max (_max) by comparing the maximum value max of Smin and Smax determined in operation S820 with another preset value max_t and selecting a smaller one of the two. If operation S830 is described by code, it may be represented by a region 930 enclosed by a dashed line in FIG. 9.

The ray tracing processing apparatus 100 determines whether the ray intersects the box by comparing the calculated Max of min (_min) with the calculated Min of max (_max) (S840). If the Max of min (_min) is less than or equal to the Min of max (_max) in operation S840, the ray is considered to intersect the box on the x-axis.

Furthermore, if the Max of min (_min) is less than or equal to the Min of max (_max) in operation S840, the ray tracing processing apparatus 100 updates the preset values max_t and min_t to the Min of max (_max) and the Max of min (_min), respectively (S860). Thus, in operation S830 for an intersection test between a y component of a ray and a box, the ray tracing processing apparatus 100 calculates a Min of max (_max) and a Max of min (_min) using the preset values max_t and min_t updated during the intersection test between the x component and the box. If operations S840 and S860 are described by code, they may be represented by a region 940 enclosed by a dashed line in FIG. 9. The condition "&& (Ray$_{t-1}$.id==Ray$_1$.id)" in region 940 indicates that the updating of max_t and min_t in operation S860 is performed only if a ray Ray$_t$.id on which a current intersection test is being performed is the same as a ray Ray$_{t-1}$.id on which a preceding intersection test was performed when an intersection test is sequentially performed on a plurality of rays and a plurality of boxes in a 3D space. FIG. 8 is based on the assumption that a ray Ray$_t$.id on which a current intersection test is being performed is the same as a ray Ray$_{t-1}$.id on which a preceding intersection test was performed, so the condition "&& (Ray$_{t-1}$.id==Ray$_t$.id)" is not shown in FIG. 8 for conciseness.

By updating the preset values max_t and min_t used in S830 to the minimum Min of max (_max) and the maximum Max of min (_min) used in operation S840 as described above, the ray tracing processing apparatus 100 also determines whether an intersecting box is a box closest to an origin of a ray or a light source.

In greater detail, the ray tracing processing apparatus 100 determines consecutively whether x, y, and z components of a ray intersect a first box (i.e., performs intersection tests between the same ray and the first box along x-, y-, and z-axes) and then determines consecutively whether the x, y, z components of the ray intersect a second box (i.e., performs intersection tests between the same ray and the second box along x-, y-, and z-axes). In this case, if the z component of the ray as well as the x and y components eventually intersect the first box, the ray tracing processing apparatus 100 also determines whether the second box is a closest box to an origin of the ray or a light source. The determination may be performed by updating preset values max_t and min_t used in operation S830 for an intersection test between the x component of the ray and the second box to a Min of max (_max) and a Max of min (_min) used in operation 840 for an intersection test between the z component of the ray and the first box. In other words, if all of the x, y, and z components of the ray intersect the second box (i.e., the same ray intersects the second box along all of the x-, y-, and z-axes), the second box is not only intersected by the ray but is also closer to an origin of the ray or a light source than the first box. Also, with respect to third through n-th boxes, the ray tracing processing apparatus 100 may determine not only whether the ray intersects a box but also whether the box is a closest box to a light source or a origin of the ray).

If it is determined that Max of min (_min) is greater than Min of max (_max) in operation S840, the ray tracing processing apparatus 100 determines that an x component of the ray does not intersect the box (S850). Thus, if one of the x, y, and z components of the ray does not intersect a box while an intersection test between each of the x, y, and z components and the box is being sequentially performed, the ray tracing processing apparatus 100 determines that the ray does not intersect the box without performing intersection tests between the remaining components and the box. For example, if the x component of the ray does not intersect the box, the ray tracing processing apparatus 100 determines that the ray does not intersect the box, and thus does not perform intersection tests between each of the y and z components and the box.

After updating the preset values max_t and min_t with the Min of max (_max) and the Max of min (_min), respectively, in operation S860, the ray tracing processing apparatus 100 determines whether the ray intersects the box along all of the x-, y-, and z-axes (S870). If the ray intersects the box along all of the x-, y-, and z-axes, the box is detected (S740).

Figure 10:
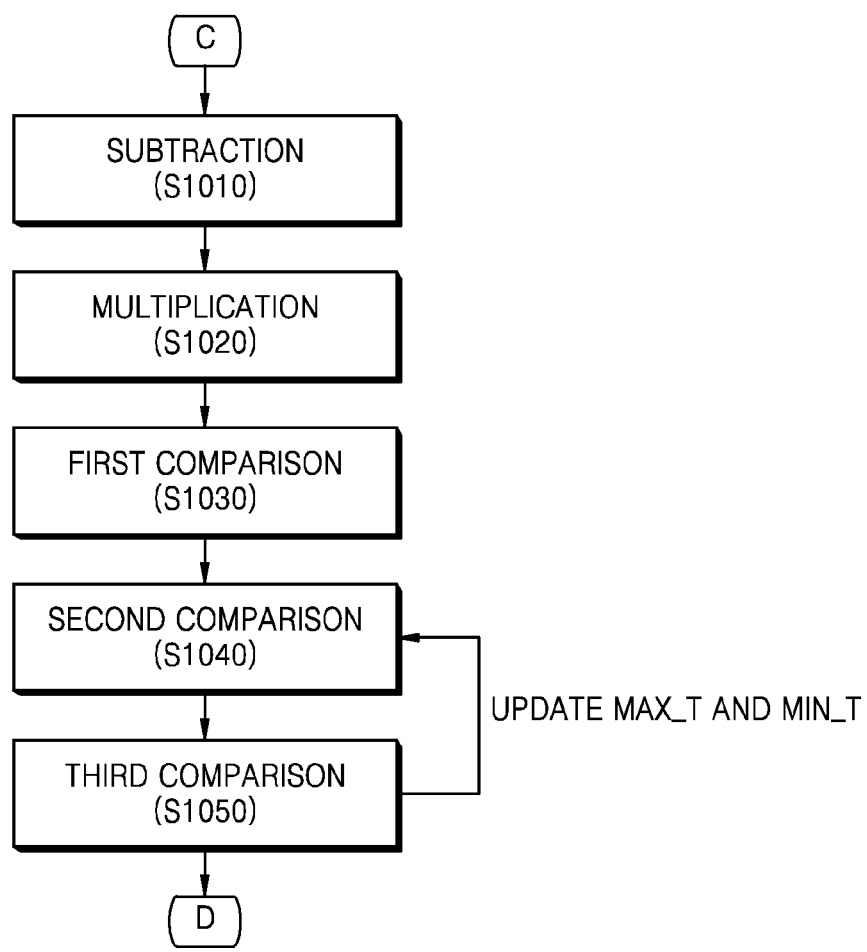
FIG. 10 illustrates an example of a five-stage pipeline for sequentially performing the method of performing a ray-box intersection test along a single axis illustrated in FIG. 7.

FIG. 10 illustrates an example of a five-stage pipeline for sequentially performing the ray-box intersection test along a single axis illustrated in FIG. 7, i.e., operations S710, S720, and S730.

Referring to FIGS. 6 and 10, the ray tracing processing apparatus 100 subtracts an origin of a ray from a coordinate of a box (S1010). In one example, the ray tracing processing apparatus 100 subtracts an origin of an x component of the ray from each of x coordinate minimum and maximum values of the box. In operation S1010, two subtraction operators are used.

The ray tracing processing apparatus 100 multiplies each subtraction result obtained in operation S1010 by a direction component of the ray (S1020). In operation S1020, two multiplication operators are used.

Through operations S1010 and S1020, the ray tracing processing apparatus 100 implements operation S810 of calculating intersection points between a box and an input ray along a single axis as illustrated in FIG. 8. Furthermore, if operation S810 is described by code, it may be represented by the region 910 enclosed by a dashed line in FIG. 9.

By performing a first comparison (S1030), the ray tracing processing apparatus 100 implements operation S820 of comparing intersection points with each other as illustrated in FIG. 8. Furthermore, if operation S820 is described by code, it may be represented by the region 920 enclosed by a dashed line in FIG. 9. In operation 1030, one comparison operator is used.

By performing a second comparison (S1040), the ray tracing processing apparatus 100 implements operation S830 of calculating a Max of min (_min) and a Min of max (_max) as illustrated in FIG. 8. Furthermore, if operation S830 is described by code, it may be represented by the region 930 enclosed by a dashed line in FIG. 9. In this case, in operation 1040, two comparison operators are used.

By performing a third comparison (S1050), the ray tracing processing apparatus 100 implements operation S840 of determining whether the ray intersects the box. If the ray intersects the box, the ray tracing processing apparatus 100 updates preset values max_t and min_t with the Min of max (_max) and the Max of min (_min), respectively (S860).

For example, when the third comparison is performed on an x component of the ray (S1050) after the second comparison is performed (S1040), the second comparison may be performed on a y component of the ray (S1040) after the first comparison is performed (S1030). In this case, if the ray tracing processing apparatus 100 determines that the x component of the ray intersects the box and updates preset values max_t and min_t in operation S1050, the second comparison may be performed on the y component of the ray using the updated preset values max_t and min_t (S1040).

In this way, if the same ray is consecutively processed through a pipeline, the ray tracing processing apparatus 100 may also determine whether the intersecting box is a closest box to a light source or an origin of the ray by updating preset values max_t and min_t used in operation S1040 with the Min of max (_max) and the Max of min (_min) used in operation S1050, respectively.

In greater detail, the ray tracing processing apparatus 100 sequentially performs subtractions on x, y, and z components of a ray and a first box for an intersection test between the ray and the first box (S1010). Subsequently, the ray tracing processing apparatus 100 consecutively performs subtractions on the x, y, and z components of the same ray and a second box for an intersection test between the ray and the second box (S1010). In this case, if the z component of the ray as well as the x and y components eventually intersect the first box, the ray tracing processing apparatus 100 updates preset values max_t and min_t used in operation S1040 to a Min of max (_max) and a Max of min (_min) used in operation 1050. Then, in operation S1040, the ray tracing processing apparatus 100 performs a second comparison on the x component of the ray for an intersection test between the x component and the second box using the updated preset values max_t and min_t. Thus, if all of the x, y, and z components of the ray intersect the second box, the second box is not only intersected by the ray but is also closer to an origin of the ray or a light source than the first box. Also, with respect to third through n-th boxes, the ray tracing processing apparatus 100 may determine not only whether the ray intersects a box but also whether the box is a closest box to a light source or an origin of the ray. As described above, if the same ray is sequentially input, the ray tracing processing apparatus 100 determines not only whether the ray intersects a box but also whether the box is a closest box to a light source or an origin of the ray by determining whether the last coordinates (e.g., z component) of a ray intersects a box when updating preset values max_t and min_t that are used as reference values in operation S1040 to a Min of max (_max) and a Max of min (_min) that are used as resultant values in operation S1050.

Furthermore, if one of the x, y, and z components of the ray does not intersect a box in operation S1050 while an intersection test between each of the x, y, and z components and the box is being sequentially performed, the ray tracing processing apparatus 100 determines that the ray does not intersect the box without performing intersection tests between the remaining components and the box. For example, if the x component of the ray does not intersect the box, the ray tracing processing apparatus 100 determines that the ray does not intersect the box, and thus does not perform intersection tests between each of the y and z components and the box.

Figure 11:
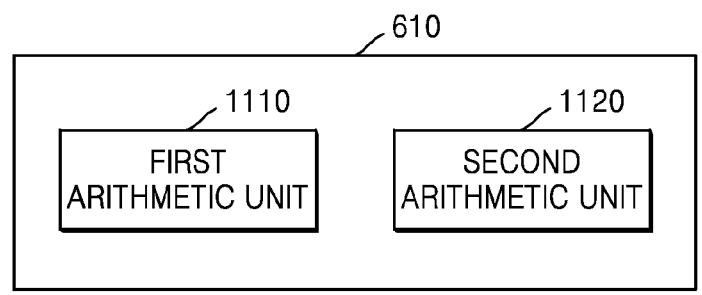
FIG. 11 illustrates an example of a configuration of the intersection testing unit of FIG. 6.

FIG. 11 illustrates an example of a configuration of the intersection testing unit 610 of FIG. 6.

In this example, the intersection testing unit 610 includes a first arithmetic unit 1110 and a second arithmetic unit 1120. The first arithmetic unit 1110 performs operations S810 illustrated in FIG. 8 and operations S1010 and S1020 illustrated in FIG. 10. The second arithmetic unit 1110 performs operations S820 and S830 illustrated in FIG. 8 and operations S1030, S1040, and S1050 illustrated in FIG. 10.

TABLE 1

| Arithmetic Unit | 3-Axis | Single-Axis |
|---|---|---|
| Subtraction | 6 | 2 |
| Multiply | 6 | 2 |
| Compare | 3 | 1 |
| Compare | 2 | 2 |
| Compare | 2 | 1 |
| Compare | 3 | |

The above Table 1 shows a difference in the number of operators needed when a ray-box intersection test is performed in a concurrent and parallel manner along three axes in a space (hereinafter referred to as a 3-axis method) and when the ray-box intersection test is performed sequentially along a single axis (hereinafter, referred to as a single-axis method) through a pipeline as illustrated in FIG. 10. The single-axis method as illustrated in FIG. 10 is implemented using a five-stage pipeline. In this case, the number of operators at each of the five stages is 2, 2, 1, 2, and 1. On the other hand, the 3-Axis method is implemented using a six-stage pipeline, and the number of operators at each of the six stages is 6, 6, 6, 3, 2, 2, and 3. As evident from Table 1, according to the single-axis method implemented using the 5-stage pipeline, the same ray-box intersection test may be performed as in the 3-Axis method even though the five-stage pipeline uses fewer operators than the six-stage pipeline in the 3-Axis method. Thus, according to an example, the five-stage pipeline in the single-axis method may be used to reduce hardware costs.

Figure 12:
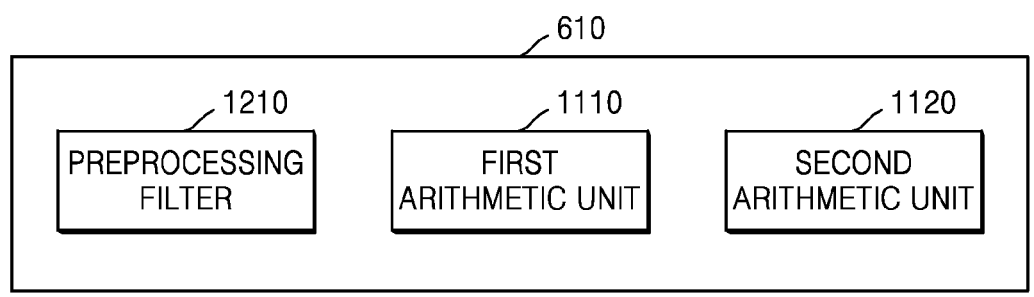
FIG. 12 illustrates an example of a configuration of the intersection testing unit of FIG. 6 including a preprocessing filter.

FIG. 12 illustrates an example of a configuration of the intersection testing unit 610 of FIG. 6 including a preprocessing filter 1210 for explaining a method of performing a ray-box intersection test. In this example, the intersection testing unit 610 includes the preprocessing filter 1210 in order to determine whether a ray intersects a box before performing arithmetic operations on the ray and three axes of the box. For example, the intersection testing unit 610 determines whether the ray intersects the box based on a direction and an origin of the ray in advance of performing arithmetic operations.

Figures 13, 14:
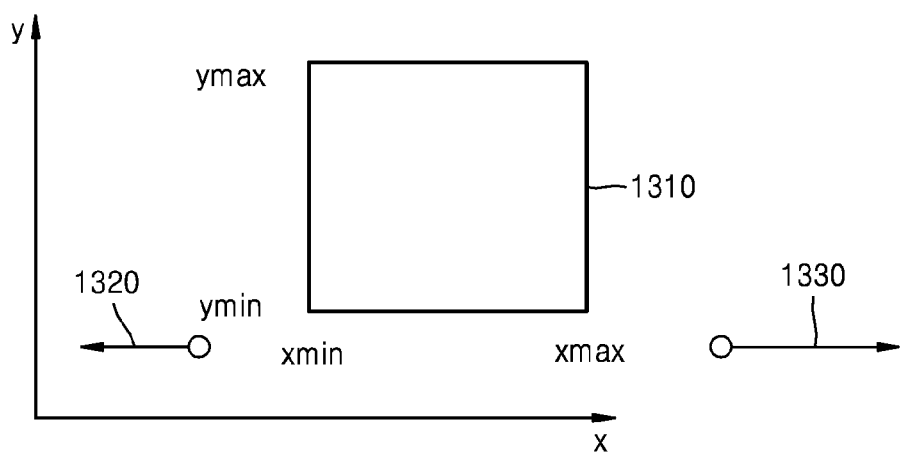
FIG. 13 illustrates an example of an operation of the preprocessing filter of FIG. 12.
FIG. 14 illustrates an example of the operation of the preprocessing filter of FIG. 13 described by code.

FIGS. 13 and 14 illustrate an example of a process of determining whether a ray intersects a box before performing a five-stage pipeline as illustrated in FIG. 10 based on information about a direction and an origin of the ray, wherein the process is performed by the intersection testing unit 610 in FIG. 12. The process is implemented by the preprocessing filter 1210 in FIG. 12. It is assumed herein that rays 1320 and 1330 and a box 1310 are in a 2D environment. As one example, if a direction of the ray 1330 indicates a positive direction of an x-axis, and an origin of the ray 1330 is greater than a maximum x-coordinate value xmax of the box 1310 as shown in FIG. 13, the intersection testing unit 610 determines that the ray 1330 does not intersect the box 1310 without needing to perform a sequential intersection test along a single axis. If the above example is described by code, referring to FIG. 14, it may be represented by a region 1410 enclosed by a dashed line. As another example, if a direction of the ray 1320 indicates a negative direction of the x-axis, and an origin of the ray 1320 is less than a minimum x-coordinate value xmin of the box 1310 as shown in FIG. 13, the intersection testing unit 610 determines that the ray 1330 does not intersect the box 1310 without needing to perform a sequential intersection test along a single axis. If this other example is described by code, referring to FIG. 14, it may be represented by a region 1420 enclosed by a dashed line. Thus, the intersection testing unit 610 including the preprocessing filter 1210 determines whether a ray intersects a box before performing the five-stage pipeline. Although the operations shown in FIGS. 13 and 14 that are performed by the preprocessing filter in FIG. 12 are described as being performed for the x-axis, they may also be performed for the y-axis and the z-axis.

The ray tracing processing apparatus 100 in FIGS. 1, 4, and 6, the ray generation unit 110, the TRV unit 120, the IST unit 130, and the shading unit 140 in FIG. 1, the acceleration structure generating device 200, and the external memory 250 in FIGS. 1 and 4, the intersection testing unit 610 in FIGS. 6, 11, and 12, the rendering unit 620 in FIG. 6, the first arithmetic unit 1110 and the second arithmetic unit 1120 in FIGS. 11 and 12, and the preprocessing filter 1210 in FIG. 12 that perform the various operations described with respect to FIGS. 1-14 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Thus, the examples described herein are to be considered in a descriptive sense only, and not for purposes of limitation. Therefore, the scope of the disclosure is defined not by the detailed description, but by the claims and their equivalents, and all variations within the scope of the claims and their equivalents are to be construed as being included in the disclosure.

What is claimed is:

1. A method of processing ray tracing, the method comprising:
    acquiring information about a light source and a bounding box that are located in a three-dimensional (3D) graphics environment, the bounding box containing an object;
    separately testing whether a ray generated by the light source intersects the bounding box in a direction parallel to each of first through third coordinate axes that define the 3D graphics environment based on the acquired information; and
    rendering the object in response to a result of the testing being that the ray intersects the bounding box along all of the first through third coordinate axes.

2. The method of claim 1, wherein the testing of whether the ray intersects the bounding box comprises performing an intersection test between the ray and the bounding box along each of the first through third coordinate axes in an order from the first to third coordinate axes.

3. The method of claim 1, wherein the testing of whether the ray intersects the bounding box comprises testing whether the bounding box is a closest bounding box to the light source; and
    determining that the bounding box is the closest bounding box to the light source in response to a result of the testing of whether the ray intersects the bounding box being that the ray intersects the bounding box along all of the first through third coordinate axes.

4. The method of claim 1, wherein the testing of whether the ray intersects the bounding box comprises:
    sequentially testing whether the ray intersects the bounding box along the first through third coordinate axes; and
    determining that the ray does not intersect the bounding box in response to a result of the sequentially testing being that the ray does not intersect the bounding box along one of the first through third coordinate axes.

5. The method of claim 1, wherein the bounding box is one of a plurality of bounding boxes each containing a respective object; and
    the testing of whether the ray intersects the bounding box comprises:
        sequentially testing whether the ray intersects each of the plurality of bounding boxes along each of the first through third coordinate axes; and
        determining that one of the bounding boxes currently determined to be intersected by the ray along all of the first through third coordinate axes is closer to the light source than another one of the bounding boxes previously determined to be intersected by the ray along all of the first through third coordinate axes.

6. The method of claim 1, wherein the testing of whether the ray intersects the bounding box comprises:
    calculating intersection points between the bounding box and the ray along one single axis among the first through third coordinate axes;

determining a minimum value between a maximum value among the calculated intersection points and a preset first reference value;

determining a maximum value between a minimum value among the calculated intersection points and a preset second reference value;

determining that the bounding box is intersected by the ray along the one single axis in response to the determined maximum value being less than or equal to the determined minimum value; and determining that the bounding box is not intersected by the ray along the one single axis in response to the determined maximum value being greater than the determined minimum value.

7. The method of claim 6, wherein the testing of whether the ray intersects the bounding box further comprises updating the preset first and second reference values to the determined minimum and maximum values, respectively, in response to the determined maximum value being less than or equal to the determined minimum value.

8. The method of claim 1, wherein the bounding box is an axis-aligned bounding box.

9. The method of claim 1, wherein the testing of whether the ray intersects the bounding box further comprises determining whether the ray intersects the bounding box using property information of the ray.

10. The method of claim 9, wherein the property information of the ray comprises information about an origin and a direction of the ray.

11. A non-transitory computer-readable storage medium storing instructions for controlling a computer to perform the method of claim 1.

12. An apparatus for processing ray tracing, the apparatus comprising:
one or more processor configured to:
separately test, based on information about a light source and a bounding box that are located in a three-dimensional (3D) graphics environment, the bounding box containing an object, whether a ray generated by the light source intersects the bounding box in a direction parallel to each of first through third coordinate axes that define the 3D graphics environment; and
render the object in response to a result of the testing being that the ray intersects the bounding box along all of the first through third coordinate axes.

13. The apparatus of claim 12, wherein the one or more processors are further configured to test whether the ray intersects the bounding box along each of the first through third coordinate axes in an order from the first to third coordinate axes.

14. The apparatus of claim 12,
wherein the one or more processors are further configured to:
test whether the bounding box is a closest bounding box to the light source; and
determine that the bounding box is the closest bounding box to the light source in response to a result of the testing being that the ray intersects the bounding box along all of the first through third coordinate axes.

15. The apparatus of claim 12, wherein the one or more processors are further configured to:
sequentially test whether the ray intersects the bounding box along the first through third coordinate axes; and
determine that the bounding box is not intersected by the ray in response to a result of the testing being that the bounding box is not intersected by the ray along one of the first through third coordinate axes.

16. The apparatus of claim 12, wherein the bounding box is one of a plurality of bounding boxes each containing a respective object; and
the one or more processors are further configured to:
sequentially test whether the ray intersects each of the plurality of bounding boxes along each of the first through third coordinate axes; and
determine that one of the bounding boxes currently determined to be intersected by the ray along all of the first through third coordinate axes is closer to the light source than another one of the bounding boxes previously determined to be intersected by the ray along all of the first through third coordinate axes.

17. The apparatus of claim 12,
wherein the one or more processors are configured to:
calculate intersection points between the bounding box and the ray along one single axis among the first through third coordinate axes;
determine a minimum value between a maximum value among the calculated intersection points and a preset first reference value; and
determine a maximum value between a minimum value among the calculated intersection points and a preset second reference value; and
the one or more processors are configured to:
determine that the bounding box is intersected by the ray along the one single axis in response to a result of the determining being that the determined maximum value is less than or equal to the determined minimum value; and
determine that that the bounding box is not intersected by the ray along the one single axis in response to a result of the determining being that the determined maximum value is greater than the determined minimum value.

18. The apparatus of claim 17, wherein the one or more processors are configured to update the preset first and second reference values to the determined minimum and maximum values, respectively, in response to a result of the determining being that the determined maximum value is less than or equal to the determined minimum value.

19. The apparatus of claim 12, wherein the one or more processors further comprises a preprocessing filter configured to determine whether the ray intersects the bounding box using property information of the ray.

20. The apparatus of claim 19, wherein the property information of the ray comprises information about an origin and a direction of the ray.

* * * * *